United States Patent [19]

Andersson et al.

[11] 4,129,144
[45] Dec. 12, 1978

[54] STABILIZING CHECK VALVE

[76] Inventors: Bo Allan Andersson, R.D. No. 2, Cambridge, N.Y. 12816; Richard P. Callahan, P.O. Box 164, Hoosick Falls, N.Y. 12090

[21] Appl. No.: 742,271

[22] Filed: Nov. 16, 1976

[51] Int. Cl.² .............................................. F16K 15/06
[52] U.S. Cl. ..................... 137/541; 137/543.21; 137/516.29; 251/358
[58] Field of Search .......... 137/540, 541, 542, 543.21, 137/543.19, 516.29; 251/332, 358

[56] References Cited

U.S. PATENT DOCUMENTS

| | | | |
|---|---|---|---|
| 1,274,680 | 8/1918 | Calvert | 137/543.23 |
| 1,774,690 | 9/1930 | Willoughby | 137/541 |
| 1,943,670 | 1/1934 | Hewitt | 137/540 |
| 2,845,945 | 8/1958 | Mancusi, Jr. | 137/542 X |
| 2,870,576 | 1/1959 | Parkel | 137/541 X |
| 3,001,546 | 9/1961 | Salisbury | 137/541 |
| 3,008,485 | 11/1961 | Johnson et al. | 137/541 |
| 3,057,372 | 10/1962 | Sutton et al. | 251/332 X |
| 3,294,116 | 12/1966 | Tremeau | 137/541 |
| 3,335,751 | 8/1967 | Davis, Jr. | 137/541 |
| 3,540,472 | 11/1970 | Brady et al. | 137/516.29 |

*Primary Examiner*—William R. Cline
*Attorney, Agent, or Firm*—Charles R. Fay

[57] ABSTRACT

A check valve comprising a housing having an annular abutment therein, a spring pressed guide in the abutment, an elastomeric disc on the guide, a conical head with an annular tapering groove facing the disc and a flat apex facing downstream, said guide having fluid passages open upon downstream pressure and the conical head and disc closing and stabilizing the valve upon lack of pressure or reverse pressure.

3 Claims, 10 Drawing Figures

STABILIZING CHECK VALVE

BACKGROUND OF THE INVENTION

There have been many check valves proposed in the prior art but in most instances they are apt to become cocked in the interior seat provided by an annular abutment in the pipe fitting in which they are located upon severe retropressure. When this happens it is almost impossible to get them out without dismantling the piping or in fact utilizing a new fitting, and it is the purpose of the present invention to avoid such wobble and to stabilize the check valve assembly as a whole so it is longer lasting and it will not become cocked or damaged or disrupted.

SUMMARY OF THE INVENTION

A check valve comprising a housing or fitting having an annular generally central abutment therein, a conical head the apex of which is flat and faces downstream, said conical head having an annular cut away portion or groove with a bottom extending generally on an angle so as to provide a tapered groove which faces upstream, the conical head being at the downstream side of the abutment, means fastening the cone to a guide in the abutment the guide including a plurality of divergent legs and a ring integral with the ends of said legs; there being a rubber disc, a rubber disc contacting part of the tapering groove in the base of the cone, and therebeing a spring located between the abutment in the fitting and the ring on the guide, so that under no pressure condition, the spring forces the guide and conical head in an upstream direction and the rubber disc against the abutment.

Severe back pressure may cause the base of the cone to contact said interior abutment and the circumferential outer area of the rubber disc then distorts and seats in the tapered groove in the conical head so that a severe retropressure is successfully withstood by the check valve of the present construction, and the flat end construction of the conical head prevents wobbling of the valve and particularly of the guide, and thus stabilizes the entire assembly.

PREFERRED EMBODIMENT OF THE INVENTION

Figure 4:
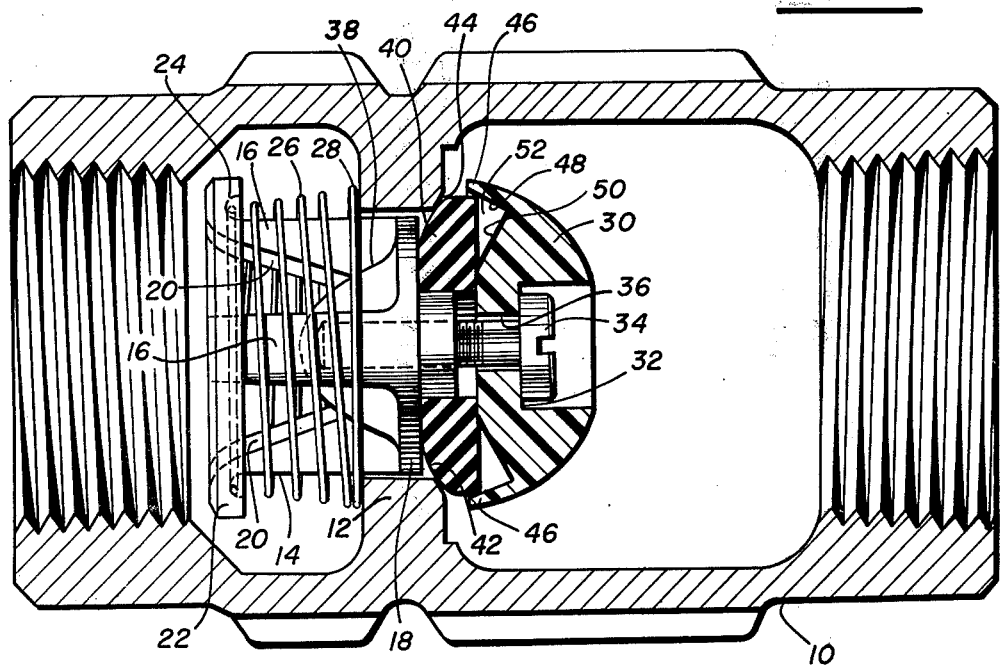
FIG. 4 is a sectional view on an enlarged scale illustrating the valve assembled in its fitting under conditions of no pressure.
Figure 5:
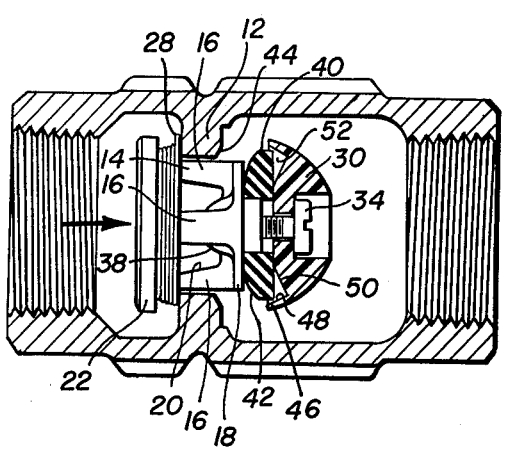
FIG. 5 is a similar view illustrating the valve under conditions of downstream pressure.
Figure 6:
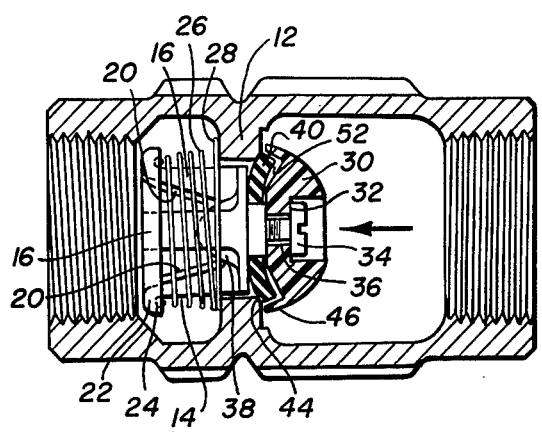
FIG. 6 is a similar view illustrating how the parts appear under retropressure.
Figure 2:
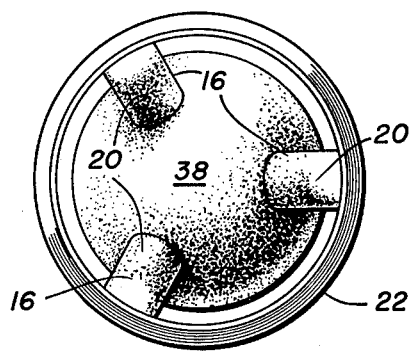
FIG. 2 is a view in end elevation looking in the direction of arrow 2 in FIG. 1.
Figure 3:
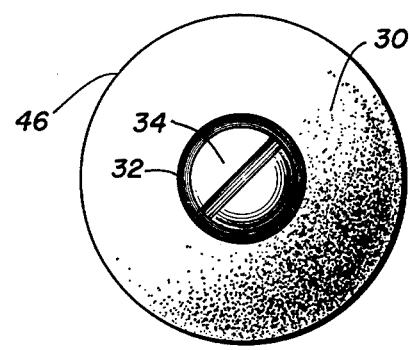
FIG. 3 is a view in end elevation looking in the direction of arrow 3 in FIG. 1.

The reference numeral 10 indicates a pipe fitting or the like kind of housing which may be threaded at each end and generally centrally thereof is provided with an internal annular abutment 12 which of course is open at the center for the flow of fluid generally from left to right in FIGS. 4, 5 and 6. The valve assembly comprises a guide generally indicated at 14 which in this case has three legs 16 extending from a disc or the like 18. These legs are tapering as clearly shown in FIGS. 4, 5 and 6 along interior edges that are indicated at 20, and when the downstream pressure impinges on these legs it tends to be evenly divided in each one of three directions at 120° with respect to each other.

Figure 1:
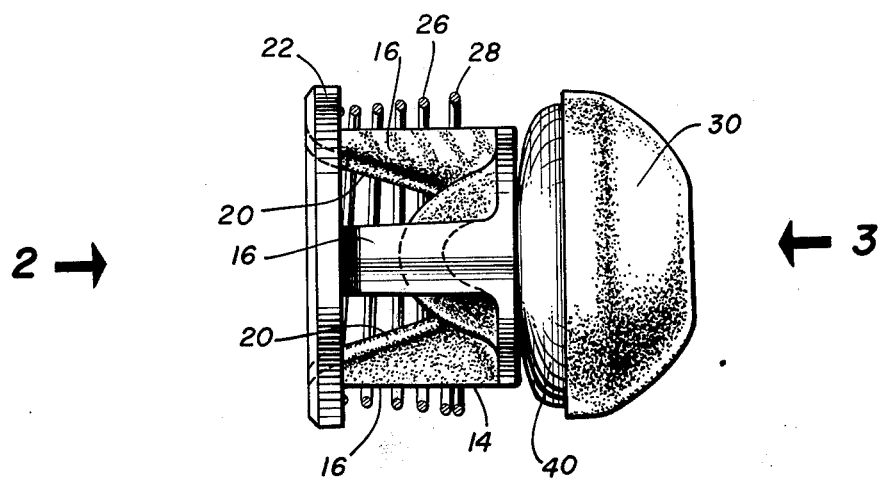
FIG. 1 is a view in side elevation illustrating the invention.

At the three thin ends of the legs 16 they merge into a continuous annular ring 22 which has an undercut 24 forcing upstream for the purpose of providing a reaction point for the generally circular end of a compression spring 26, the other end of which at 28 impinges upon the abutment 12 thus holding the parts in stable condition as shown under conditions of nonoperation as in FIG. 1.

A generally conical head member 30 which is preferably plastic has a flattened apex at 32 which provides for a flat headed screw 34 extending through a central opening 36 in the conical head to thread into the disc 18 and also into an upstream abutment or projection thereof 38, thereby holding the conical head 30 at the downstream side of the abutment 12. Interposed between the conical head 30 and the abutment 12 and bearing on the circular disc 18 of guide 14, there is an elastomeric disc 40 which has an open central portion through which the screw 34 passes. This disc is preferably provided with an annular rounded off upstream edge surface 42. Rubber disc 40 is clamped to the plastic disc 18 but the thinner outer edges of the rubber disc engage seat 44 in abutment 12. This seat is also annular and appears at the downstream face of the abutment 12.

The edge of the base of the conical head 30 is annular and indicated as at 46—46. This diameter is greater than the diameter of the seat 44 and of course is greater than the diameter of the opening in the abutment 12. Instead of being flat, the base of the conical head 30 is provided with an annular groove facing upstream and including a pair of side walls 48 and 50, of which 50 can be said to be the bottom. This bottom tapers as shown at an angle with respect to the axis of the assembly so as to provide a tapering groove 52 together with the side wall 48.

FIG. 4 shows the parts at rest with the spring 26 holding the guide extended in upstream direction, the rounded off edge 42 the elastomeric disc abuts the seat 44 of the abutment 12 and the valve is thus closed against any upstream pressure on the conical head 30. With downstream pressure, the device will appear as in FIG. 5 with the spring 26 compressed, the valve open and the fluid passing through the ring and the openings between the legs of the guide 14. In this case the rubber disc 40 is completely removed from the seat 44. This represents normal operating conditions under full head of pressure downstream.

If there should be pressure in the opposite direction as indicated in FIG. 6 the rubber disc 40 tends to be thrust through the opening of the abutment 12, and in many cases in the prior art this results in a cocked condition of the valve so that the rubber washer becomes stuck in the opening of the abutment 12 and sometimes it is virtually impossible to put the parts back into operating condition. However, as shown in FIG. 6 the tapering groove 52 evenly receives the distorted circumference of disc 40 which therefore does not become cocked or jammed in the opening in the abutment and can easily be returned to its flattened condition as in FIG. 4 upon relief of the reverse pressure. At the same time the conical head contacts the abutment just outside of the seat 44, thus mechanically and positively stopping the progress of the assembly any further to the left as shown in FIG. 6. The flat face 32 of the conical head 30 receiving the brunt of the retropressure stabilizes the entire device and flutter and gyration of the guide itself is thereby eliminated.

Figure 7:
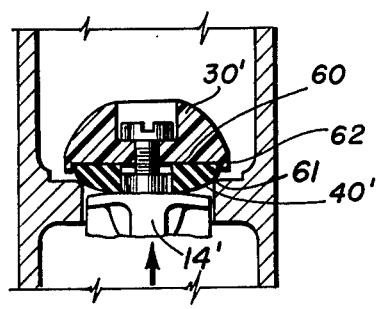
FIG. 7 illustrates a modification.

In FIG. 7 the conical head 30' is provided with a flat bottom undercut 60 which receives the rubber disc 40' without distortion or bending at the edges thereof. The action is somewhat the same as in FIG. 6 except that instead of flexing upward it will flex downward when compressed to the tapered seat area 61 provided on guide 14. This is made possible by the rim 62 on conical head 30, said rim being occasioned by the cut away face 60.

Figure 8:
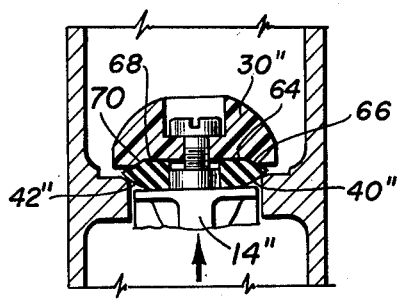
FIGS. 8-10 illustrate further modifications.

In FIG. 8 the conical head 30" is relieved at its upstream face as indicated at 64 by having a tapered indentation or wall 66 and a flat bottom 68. In this case the rubber washer 40" is formed to conform to flat bottom 68 and wall 66 as at 70 with an open parallel running space between wall 66 and the surface 70.

However, in FIGS. 7 and 8 the action is substantially the same and the construction of the guide is the same as before described.

Figure 9:
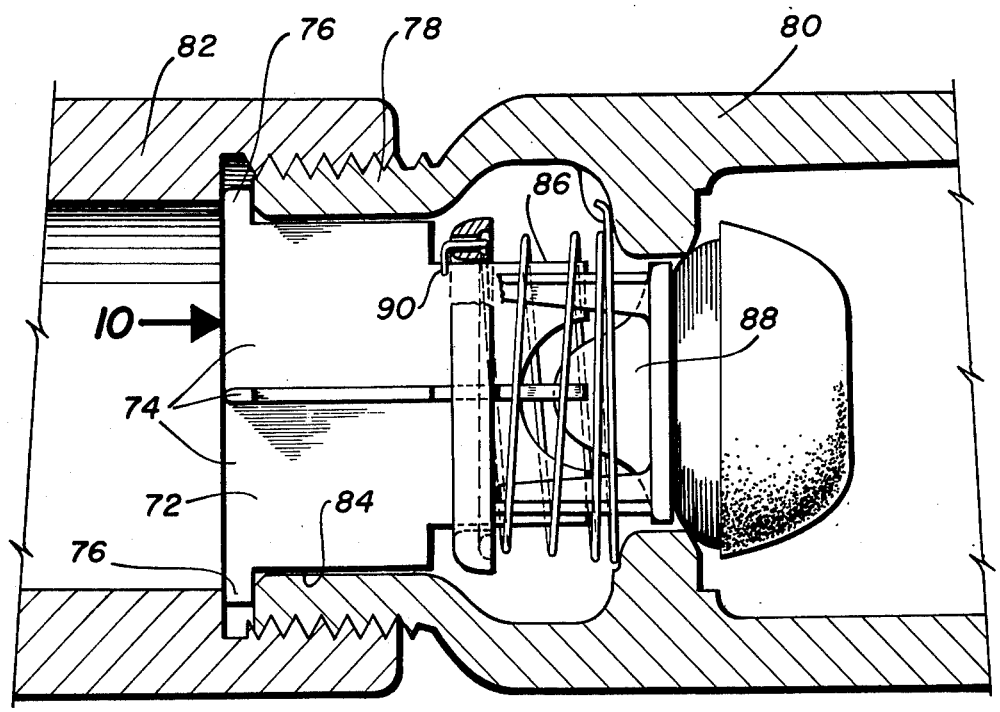
Figure 10:
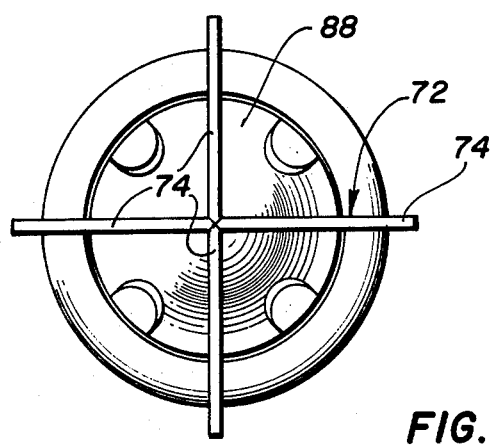

FIGS. 9 and 10 illustrate a vane 72 having in this case, the four leaves 74 each with a foot 76. These feet are trapped and held between the reduced threaded portion 78 of the fixture 80 and a shoulder on the pipe or other connection 82. The leaves of the vane extend downstream as in straight edges 84 e.g., and terminate in fingers 86 that receive the poppet assembly 88 before described and prevent it from moving to an undesirable degree under conditions of turbulence. The leaves tend to convert turbulent flow to linear flow, and thus the check valve is further stabilized. Also the spring may be anchored in the guide ring preventing spinning of the spring. This construction is indicated when the stabilizing valve is mounted directly on the discharge of the pump, turbulence being encountered in such conditions.

I claim:

1. A check valve comprising a housing, an annular abutment in the housing forming a central opening, and a check valve assembly mounted on said abutment, said abutment having a valve seat thereon, said assembly comprising a guide, a spring mounted between portions of the guide and said abutment normally tending to hold the check valve assembly substantially in upstream closed position, a head on said guide, said head being located at the downstream side of the abutment, said head having a base facing the abutment, an elastomeric disc between the base of the head and the abutment, said elastomeric disc having a diameter greater than the opening through the abutment, and the base of the head having a recess therein facing the disc and receiving portions of said disc under conditions of retropressure, the disc having a stability normally maintaining it generally free of the recess, said head being substantially conical and having a flat apex area facing downstream, a fastener having a fastener head located in the flat apex area of said conical head and a part of the fastener passing through said conical head and secured with respect to said guide, said recess in the base of said head comprises an annular groove facing said disc, said groove having a bottom inclined with respect to the axis of the housing and of the check valve assembly, said inclined bottom extending from a central portion of the base of said head outwardly and in a downstream direction, said elastomeric disc having a rounded surface facing said abutment and said valve seat, and means on the guide to anchor said spring at the end thereof opposite said abutment.

2. The check valve of claim 1 wherein said guide includes at least two spaced legs having diverging inner edges facing upstream.

3. The check valve assembly of claim 2 wherein said edges are flat.